May 20, 1958  V. H. WILDER  2,834,998
MEANS FOR MOUNTING A FRANGIBLE EXPANSE TO A VIBRATILE SUPPORT
Filed Jan. 25, 1954
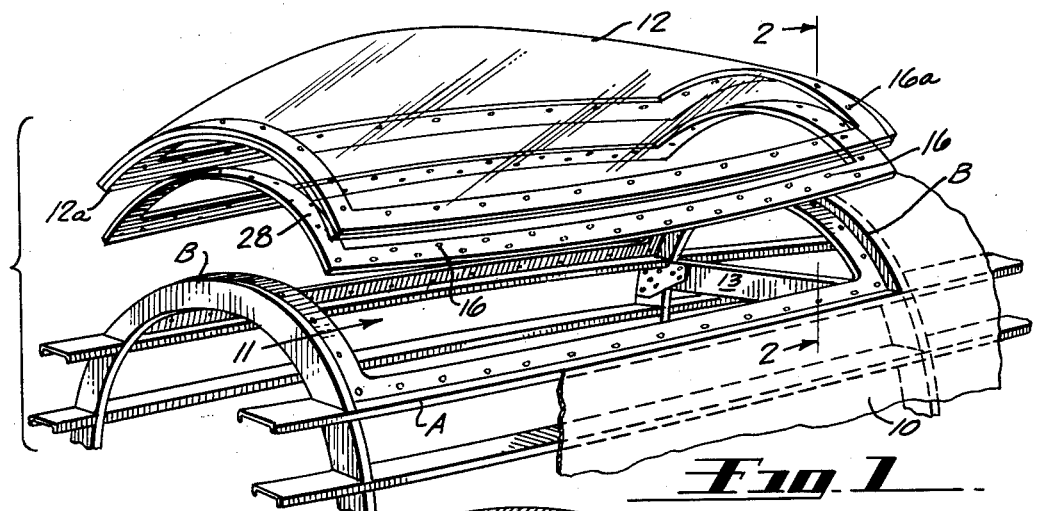
Fig. 1
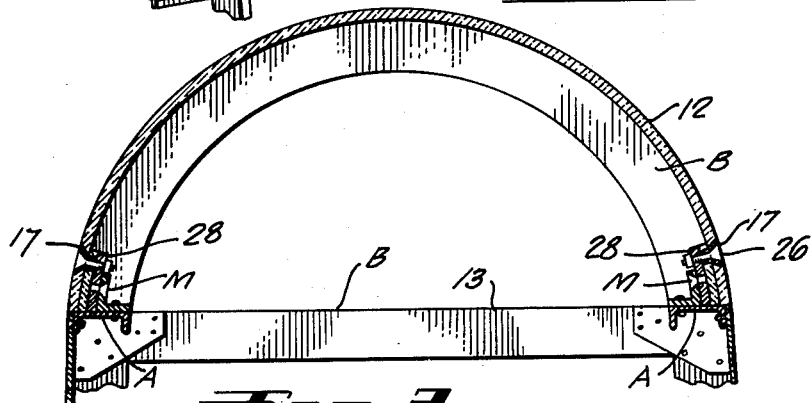
Fig. 2
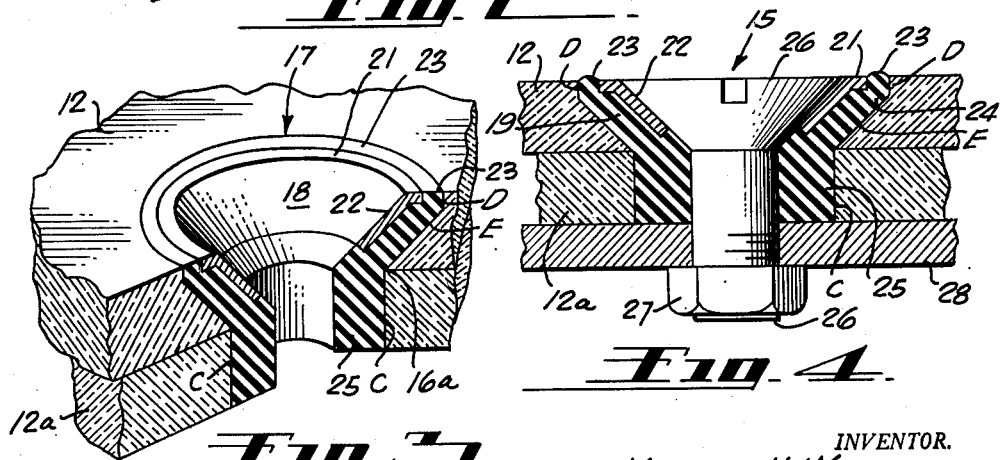
Fig. 3
Fig. 4
INVENTOR.
VERNON H. WILDER
BY
Edwin Coates
ATTORNEY

United States Patent Office 2,834,998
Patented May 20, 1958

2,834,998

MEANS FOR MOUNTING A FRANGIBLE EXPANSE TO A VIBRATILE SUPPORT

Vernon H. Wilder, Long Beach, Calif., assignor to Douglas Aircraft Company, Inc., Santa Monica, Calif.

Application January 25, 1954, Serial No. 406,042

3 Claims. (Cl. 20—56.4)

This invention is concerned with the art of mounting to openings in the framework of aircraft, transparent closure members such as those composed of synthetic organic thermoplastics.

These closures are quite definitely frangible or brittle and have coefficients of thermal expansion which are at wide variance with those of any of the metallic fastening means that have to be employed in attaching them to the framework. This latter fact, coupled with the quite noticeable vibrations or shocks imposed on the metallic fuselage framework and thence transmitted to the plastic sheet, invariably results in failure of the sheet around the multiplicity of fastener holes. This failure takes the form of radial cracks radiating from the bolt holes which cracks of course eventually render the sheet, canopy or view-closure unserviceable.

At the elevated speeds reached by supersonic airplanes the detrimental effects of aerodynamic buffeting and/or ultra high air-compressibility effects, are added to the already serious situation.

The areodynamic bodies closed off by these frangible, thermally responsive, thin panels are, nowadays, pressurized in their interiors, the air therein sometimes being at a much higher pressure level than the ambient atmosphere. This fact not only creates hoop-tension in this plastic sheet, but sets up severe local tensile stresses in the peripheral margins thereof under the reaction of the fastening means.

Moisture in the "compressibility airstream" is of course forcefully driven into all the gaps and crevices of the jointure or mounting.

The upshot of the matter is that allowances must be made to accommodate these stresses, one such allowance consisting in halting the bolt-torquings before their optimum is reached so as to leave "slack" to absorb the compensatory movement of the panel under these stresses. The consequences relating to the proper mounting of the canopy are obvious.

This invention provides a mounting means and mount for the aforementioned readily frangible, thermally distortable sheets which, although mounted air-tightly to a very vibratile fuselage framework, are stress-stable and will not "star" at all in any location under any normal influence. That is to say, the panel anchoring bolts or screws can be "set up" to their maximum torque, leaving none of the previous "play" and tightly clamping the sheet to the canopy frame yet no normal vibratory force or heat differential between the fasteners and the plastic can possibly "star" or otherwise damage the frangible sheet.

The mounting means of the invention also includes means for holding down the escape of pressure air out of the cabins and cockpits of pressurized aircraft to a totally negligible amount, the same means equally well preventing the supersonic airstream from blasting moisture into the cockpit or cabin.

In one of the presently-preferred embodiments of the invention it roughly and broadly consists of a laminated insert adapted to be coaxially mounted in the bolt-holes of the closure sheet and centrally bored to pass the fastener shank therethrough while seating the head of the fastener coaxially in the insert. More specifically, the insert essentially comprises, for use with an elongate metallic fastener having a "flush," or flat, head, a two-ply, laminated insert made up of a "dished" or concave inner ply or lamina which is hard, rigid, wear-proof and force-transmitting and is physicochemically bonded to an outer ply which is arranged coaxially therewith around the outer convex surface of the hard inner member. The outer ply must be of a very soft, cold-flowable material which is also resiliently-distortable, that is, quickly recuperative dimensionally, as well as being impervious to water and air. This dished, grommet-like component bears, by its concave outer surface, directly against the wall of the fastener-aperture in the plastic sheet. Preferably, the "wear-plate" inner member extends longitudinally only a portion of the inside length of the outer component and has its upper, or outer, peripheral edge "hooked over" the adjacent upper and thin edge of the outer component. The lower edge of the latter is preferably extended longitudinally and shaped differently from the upper portion thereof in such a manner as to envelope a portion of the length of the shank of the fastener and the extension lies between this shank portion and a re-inforcing substructure, if such is used, under the plastic sheet.

Briefly, the viscously-flowable, resiliently-recuperative outer component of the insert, having high internal molecular friction receives the fastener vibrations, compression and tensions, as well as the thermal-stress differential, from the inner rigid component of the insert. The outer component then undergoes "internal working" and transforms these forces into internal heat energy of a low order, thereby dissipating these forces to the air.

The lateral component of the downward thrust of the bolt in the insert is applied by the aforesaid flange or hook concentratedly to the thin upper peripheral end of the soft component and it is thereby urged forcefully outwardly and engages the adjacent wall of the aperture in the plastic in a gastight manner, thus constituting the primary seal in the bolt holes against escape of pressure air and airstream-driven moisture. A secondary such seal is constituted by the lateral and longitudinal thrusts of the main body of the hard-component against the body of the soft component of the insert.

By virtue of the compressive action exerted by the lip or flange of the hard member, when the bolt is tensioned, on the one end of the surrounding soft component, coupled with the reaction on the opposite end of the soft member, of the nut for the bolt, this soft flowable member is positively substantially confined in the aperture in the sheet, so that it cannot be extruded entirely out of the aperture and "overflow" onto the faces of the Plexiglas sheet and thus leave the fastener and insert without vibratory and thermal force-dissipating means. By the same token, this confinement protects and safeguards the soft material against abrasion, contamination and oxidation by the two highly pressured and oxygenated air layers attacking it otherwise.

The insert is entirely unattached to the fastener or the aperture wall and hence partakes of none of the previous disadvantages consequent thereupon. However, it is to be noted that the soft component is, for at least a portion of its length, chemically bonded to the entire length of the hard, inner component. Among other advantages, this arrangement limits the amount of the thickness of the soft material which is free to move relatively to the hard liner and this reduces shear, tearing or other disintegration, as well as always obtaining the use of the full thickness-action of the outer component.

Preferably the fastener head is flat, flush and frusto-conical with an included angle of the order of 100° and the hollow, concave insert takes a cross-sectional form conforming closely to this shape. That is, the insert components are both frusto-conical in shape. As a consequence, the head and insert undergo a wedging action which establishes the aforesaid two seals while allowing the plastic sheet to reciprocate with the fastener head "floating" up and down in the soft-material of the insert. The plastic panel is thus entirely floatingly mounted by the present attachment means, yet after oscillating under vibrations, returns into airtight engagement with the supporting frame.

Because of the further fact that the present mounting and attaching arrangement and means relieve the peripheral margin of the attached frangible sheet of unbalanced tensile forces by virtue of the yielding and lateral-tension absorbing insert, and due to the aforementioned facts about the elimination of "starring" and other vibration and heat-caused failures, as well as the other panel-stabilizing features of the invention, it is a definite fact that plastic sheets as frangible and "starrable" or disintegratable as the brittlest of soda glasses are rendered employable in aircraft by this invention. However, the insert is particularly conceived as designable into the more commonly employed closure-materials for aircraft. It hence contemplates the combination of the insert of the invention with such synthetic resins and organic synthetic thermo-plastics as the acrylic resins—methyl methacrylate being the chief—cellulose acetate, polyvinyl butyral and acetal, polystyrenes, phenolformaldehyde polymerization products, and homologues and analogues thereof.

However, the concept is not limited to combination with these specific sheet-materials, being needful wherever any frangible transparent sheet having a high coefficient of linear expansion relative to that of metal fasteners and mountings is to be fastened to a vibratile, heat-responsive, air and moisture blasted pressurized structure.

The aforestated nature and accomplishments of the invention do not constitute the entire repertory and catalog of its merits and innovations, being presented merely to clarify the aims, nature and advances of the invention.

In order to further clarify the exact nature and effects of the invention, that one of the specific embodiments thereof herein chosen for disclosure by way of example, is depicted in the drawings. Same is described in detail and part-by-part, hereinafter and interpreted by reference to the accompanying drawings.

In these drawings,

Figure 1 is a fragmentary, exploded, perspective view of a high-speed airplane having a cockpit closure, or canopy, mounted to the framework of the cockpit by the present fastening means;

Figure 2 is a fragmentary cross-section of the cockpit taken on line 2—2 of Figure 1;

Figure 3 is an enlarged fragmentary perspective view of a portion of the mounted Plexiglas canopy as including one of the mounting means of this invention with the fastener omitted, and Figure 4 is an enlarged fragmentary longitudinal section of a mounting with the fastener tensioned to the limit to clamp the panel to the framework and concurrently actuate the differential components of the insert.

The invention is illustrated in Figures 1 and 2 as so associated with the fuselage 10 of a high-speed aircraft having a pressurized cockpit 11 therein as to detachably attach the Plexiglas panel 12 to the hollow or open framework 13 or bow of the canopy-unit in the improved manner aforedescribed. The panel 12 may incorporate edge-reinforcing strips 12a, as in Figures 3 and 4 and attaching means extending thru both into the element 28 of the framework 13. The latter in turn is detachably attached to longerons A and spreaders B defining the cockpit opening. Ordinary screws M may effect this union.

The Plexiglas "bubble" is detachably secured to the canopy frame-work, in order to enable inspection, repair or replacement thereof, by a plurality of the novel mounting and attachment units 15 incorporating the present invention. In Figure 2 the fastening means employed with the novel mounting unit is shown as consisting of a flat-head screw 26 passing thru hole 16a in the canopy and hole 16 in the canopy frame 28.

Mounted coaxially and flush in each of the screw-holes 16a in the Plexiglas is one of the present inserts 17. The apertures in the Plexiglas are preferably defined, first, by forming (Figure 3) a small-diameter cylindrical full-through bore C; then forming a large-diameter, shallow counter-bore D, and finally forming a frusto-conical countersink E having an included angle of not less than 100°.

The articles 17 are, considered overall as a unit, conformed to the overall shape of the walls of these bores so as to adapt them to seat congruently and coaxially therein as, and for the purposes, aforedescribed.

Each of the articles 17 in effect consists of a radially laminated, longitudinally resiliently compressible wedge-action insert adapted to coact with a metallic, flush-head fastener in such manner as to relieve the Plexiglas of unbalanced stresses originating in fuselage vibrations, aerodynamic buffeting and thermal-stress differentials between the Plexiglas and the metallic fastener. Concurrently, the fastener head and the insert are mutually so relatively configured and arranged and constructed with respect to each other and to the Plexiglas sheet, the canopy frame, and the fuselage framework, as to gastightly seal the fastener holes in the Plexiglas and to enable the fastener to tightly clamp the Plexiglas to the canopy frame while permitting a limited amount of yielding movement of the Plexiglas in the fastener's axial direction, thus to "float" the Plexiglas in a novel, shock-proof mounting for canopy panes.

To these and other ends, the unit 17 consists, first, of an inner, dished or concave, hard, rigid metallic lamina 18 which, as will appear, serves as a mold-base, a wear-plate, a washer, and a force-director and concentrator. In the illustrative embodiment, lamina 18 takes the form of a hollow frustocone having an included angle of 100° and, being generically conical, having a "broader end," or base-portion.

Member 18 does not extend axially the full length of the unit or of the countersunk aperture in the Plexiglas, for reasons hereinafter explained.

Molded into conformity with the outer convex surface of 18 and with the wall of the bores D, E, and C is a funnel-shaped integer 19 composed of a special material. This material must be impervious to air and water; must be very soft yet resilient-elastic and be highly dimensionally-recuperative; and preferably be viscously-flowable in the cold state, that is, possess high internal molecular friction.

Many synthetic and natural elastomers are suitable for making into an element of this kind among which may be included buna-n and neoprene as well as India rubber.

In any event, this member 19 is physico-chemically bonded to the outer convex surface of 18 in such a manner as to bring into any shear action which may occur between 18 and 19, the full thickness of 19 and also to limit the amount of 19 subject to longitudinal movement. Since lamina 18 exerts considerable radial and axial force on 19 when the fastener is tensioned the importance of this kind of bonding cannot be ignored.

The upper, or outer, peripheral edge of member 18 bears an annular flange 21 which extends sufficiently outwardly at right angles to the major axis of the insert as to subtend or intercept between the outer edge of the flange and the wall of the counterbore D, an annular lip 23 in the elastomer, which lip, with the cooperation of the flange and the fastener head, establishes with the wall D, a substantially gas-tight primary seal against escape of cockpit air and entry of air-blasted moisture, all as hereinafter explained.

The frusto-conical body 22 of the rigid member 18 exerts a downward and outward urge on the frusto-conical body 24 of the outer lamina when the head is seated by fastener-tensioning in order to establish a secondary gastight seal of body 24 with countersink E.

The outer end of frusto-conical body 24 is larger than the inner-end region or portion thereof. Geometrically considered, therefore, this outer end portion is the base, or base-portion of this frusto-conical member. The truncated, lower end of the body 24 is extended axially beyond the main body of the insert in the form of a hollow-cylindrical, radially and axially compressible neck 25, adapted to seal the reinforcer 12a and to isolate same from vibratory and thermal stresses.

As will be seen in Figure 4, by virtue of the floating mounting, the Plexiglas sheet may move axially relatively to the axis of the fastener an amount limited only by the configuration of the elastomer with the aperture, and fastener head, yet will return tightly to its initial, clamped place in the canopy frame when the disturbing force is removed.

Thus, in effect the Plexiglas panel "floats" in, or is buoyed by, the present mount, and the fasteners can be tensioned to their maximum without any reasonable possibility of the Plexiglas suffering damage from vibratory or thermal forces. The extreme meticulousness and labor heretofore required in torquing the fasteners on Plexiglas canopies is hence totally obviated.

In Figure 4, a flush-or-flat-head machine bolt 26 is shown employed with a nut 27 against the canopy frame member 28, and this figure well illustrates the floating, wedging and sealing, and confining actions of the invention. The "wedge-member" 18, under the action of the wedge-head screw or bolt, first applies a lateral force to the lip 23 and urges it gastightly against the adjacent surface of the Plexiglas without extruding an appreciable amount of the elastomer. The frusto-conical body of member 18 concurrently moves downwardly and exerts lateral and longitudinal forces, the former establishing the secondary seal and the latter axially resiliently compressing the elastomer between the flange and the nut so as to positively prevent axial extrusion or overflow of the elastomer while still enabling the screw and Plexiglas to "bounce" or oscillate, back and forth in the rubber. The shank 25 of the outer lamina is, by these actions, pressed sealingly against the shank of the fastener and the Plexiglas while still absorbing and dissipating vibratile and thermal stresses by its doing internal work, as aforedescribed.

The device facilitates the installation of the fasteners because of the centering and "socketing" action on the fastener of the concave insert.

Alignment of the holes in the Plexiglas with the holes in the canopy frame in assembling the two is facilitated by virtue of this substantially self-centering feature.

Since the member 18 sinks into the static, soft and yielding resilient-elastic material, conversely to the ordinary grommeting action in which the rubber is squeezed radially inwardly toward the rigid washer and thereby hardened and deprived of its power to do internal work, the frangible sheet is better cushioned to the frame-work than heretofore found feasible.

The insert is rendered readily usable to protect thinner Plexiglas sheets by the mere act of cutting off a portion, or all, of the neck 25.

Since the cushioning, work-absorbing, and sealing lamina 19 is entirely free from, and unattached to, either the fastener or the Plexiglas, not being coated to the fastener or the aperture walls, contrary to previous practice, the insert is adapted to exert a better cushioning effect than integrally-coated fasteners, as well as to effect better sealing. Since the insert is always truly centered in the hole in the Plexiglas and relative to the support, the fastener's seats in the Plexiglas and in the frame are pre-aligned for it.

Although a certain one of the presently-envisioned specimens of the mounting means has been specifically described with reference to its particular geometry, shape, location composition and environment, such specificity in no wise limits the legal scope of the invention itself. For, the present inventive concepts have a scope which is co-extensive with that of the sub-joined claims that define the invention in terms of the basal and essential syntheses of the essential elements thereof.

I claim:

1. Means for mounting a frangible expanse to a vibratile support therefor, comprising: fastener means having a head and a shank; a frangible expanse having an aperture thru which the shank passes and in which the head seats; and a radially laminated insert interposed between the head and shank of the fastener and the wall of the aperture; the innermost one of said laminations being rigid and conformed to receive the fastener head therein in contact therewith and the outermost lamination being viscously-flowable and resiliently recuperative; the innermost, rigid lamination having, in longitudinal section, a substantial wedge-like shape; and an annular flange on the periphery of the broad end of the wedge-like lamination adapted to radially abut the adjacent end of the resiliently recuperative lamination; whereby tensioning of said fastener-means urges the abutted portion of said recuperative lamination outwardly gastightly against the outer end of the aperture's wall to establish a primary seal and the body of the rigid lamination concurrently urges the remainder of said recuperative lamination gastightly against the adjacent portion of the wall of said aperture.

2. As a new article of manufacture: an insert for isolatingly engaging a vibratile, thermally distortable conical-headed fastener in an aperture therefor in a readily frangible, thermally distortable sheet and comprising: a rigid, hard, cold-unflowable member having a hollow-wedge shape in longitudinal section and adapted to receive the head of said conical-headed fastener therein; and a soft, cold-flowable, resiliently-recuperative member disposed coaxially of the outer surface of the rigid member and having a hollow-wedge shape in longitudinal section; said soft member having its outer surface shaped conformingly to an aperture provided in said frangible sheet for receiving the entire insert, thereby to adapt said soft member to congruently seat in said aperture, said hard member being arranged to receive and laterally and longitudinally transmit a lateral and a longitudinal force-component from the wedging of the fastener head therein; and finite radially projecting annular means arranged annularly of the base of said hard member for radially applying most of said lateral component to the peripheral marginal portion of the base of said soft member so as to gastightly seal same in said aperture.

3. As a new article of manufacture: an insert for isolatingly engaging a vibratile, thermally distortable conical-headed fastener in an aperture therefor in a readily frangible, thermally distortable sheet and comprising: a rigid, hard member having a hollow-wedge shape in longitudinal section and including a cone's base-portion and adapted to receive the head of said conical-headed fastener therein; and a soft, cold-flowable, resiliently-recuperative member disposed coaxially of the outer surface of the rigid member and having a hollow-wedge shape in longitudinal section and including a cone's base-portion radially adjacent the first-said base-portion, said soft member being axially longer than said hard member; said soft member having its outer surface adapted to congruently seat in said aperture; said hard member having an inner face shaped and arranged to wedgingly receive a conical-head fastener therein, thereby to direct fastener head forces laterally to said soft member; an annular flange on the hard member's base portion, said flange projecting outwardly from said base-portion into contact with the radially adjacent portion of said soft member so as to apply a lateral thrust to said portion of said soft member sufficient to seal said portion of said soft member to said wall, thereby to constitute a primary air-seal for said insert in the aperture in said sheet; the portion of said hard member lying longitudinally inwardly adjacent the flanged portion extending conformingly along the inner surface of the radially adjacent portion of said soft member, so as to wedgedly apply a lateral thrust to said radially adjacent portion of said soft member sufficient to seal the latter portion air-tightly to said wall, thereby to constitute a secondary air seal thereat for said insert.

References Cited in the file of this patent

UNITED STATES PATENTS

| | | |
|---|---|---|
| 1,096,846 | Lane et al. | May 19, 1914 |
| 1,814,502 | Barwood | July 14, 1931 |
| 1,888,669 | Hossfeld | Nov. 22, 1932 |
| 2,235,429 | Henry et al. | Mar. 18, 1941 |
| 2,314,949 | Palmer | Mar. 30, 1943 |
| 2,358,485 | Warren et al. | Sept. 19, 1944 |
| 2,367,035 | McConnell et al. | Jan. 9, 1945 |
| 2,372,939 | Elliott | Apr. 3, 1945 |
| 2,432,050 | Thiry | Dec. 2, 1947 |
| 2,439,516 | Holcomb | Apr. 13, 1948 |
| 2,566,777 | Schmidt | Sept. 4, 1951 |
| 2,678,585 | Ellis | May 18, 1954 |
| 2,696,451 | Snyder | Dec. 7, 1954 |
| 2,755,056 | Hutton | July 17, 1956 |
| 2,756,795 | Clingman | July 31, 1956 |
| 2,760,400 | Mills | Aug. 28, 1956 |
| 2,760,898 | Voelker | Aug. 28, 1956 |

FOREIGN PATENTS

| | | |
|---|---|---|
| 618,962 | Great Britain | Mar. 2, 1949 |
| 884,145 | France | Apr. 12, 1943 |